(No Model.)
F. E. & F. O. WELLS.
TIRE UPSETTER.
No. 269,901. Patented Jan. 2, 1883.
Fig. 1.
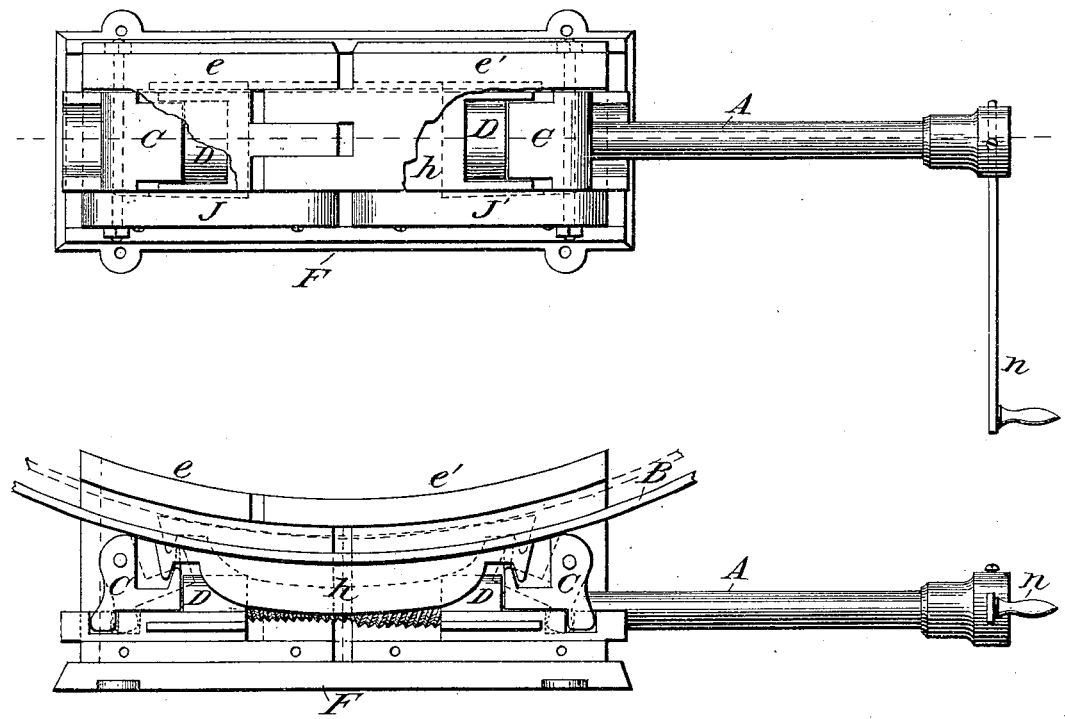
Fig. 2.
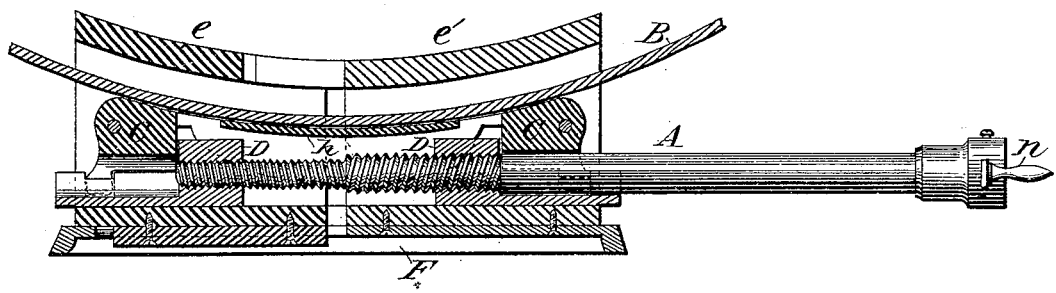
Fig. 3.
Witnesses:
Samuel G. Truesdell
Albert B. Yaw
Inventors:
Frederic E. Wells
Frank O. Wells

UNITED STATES PATENT OFFICE.

FREDERIC E. WELLS AND FRANK O. WELLS, OF GREENFIELD, MASS.

TIRE-UPSETTER.

SPECIFICATION forming part of Letters Patent No. 269,901, dated January 2, 1883.

Application filed July 24, 1880. (No model.)

*To all whom it may concern:*

Be it known that we, FREDERIC E. WELLS and FRANK O. WELLS, of Greenfield, in the county of Franklin and State of Massachusetts, have invented a new and useful Improvement in Tire-Upsetting Machines, which improvement is fully set forth in the following specification, reference being had to the accompanying drawings.

The object of the invention is to shorten tires without cutting and welding them.

In the accompanying drawings, Figure 1 is a top view; Fig. 2, a front view; and Fig. 3 is a longitudinal section through the middle.

B represents the tire.

C C are the cams, which swing on bolts which pass through them from pieces $e\ e'$ to plates J J'.

$h$ is the shoe or follower, the ends of which rest on projections on the cams C C.

D D are the nuts, one with a right-hand and the other with a left-hand thread, which govern the motion of cams C C.

A is a right and left hand screw-threaded shaft, the revolving of which moves the nuts D D.

F is the bed-piece.

$e\ e'$ are attached to the bed, one tightly and the other loosely.

The operation is as follows: The tire, being heated about three or four inches in length, is placed in the machine with the hot place equidistant from the cams and resting on them. The shaft A is then revolved by means of handle $n$, which causes the nuts D D to move toward each other, and the cams C C to turn on their axes until the tire is held between cams C C and pieces $e\ e'$. The shoe is also raised as fast as the tire until the tire is held. It then slides on the cams to prevent its rising higher and pressing too hard on the tire. The tire being now held fast and the revolutions of the shaft continued, the piece $e$, which is attached to the bed loosely, moves toward the other, and the tire is upset. The shoe $h$ prevents the tire from bending down and the pieces $e\ e'$ prevent it from bending up.

We do not claim as a part of our invention the smaller part of the shaft-screw having a finer pitch than the larger part, which would make a differential screw, as this is not essential.

Having thus described our invention, we claim and desire to secure by Letters Patent—

1. The combination of the shoe $h$ and pieces $e\ e'$, cams C C, nuts D D, and shaft A for the purpose of upsetting the tire and incidentally preventing it from bending, substantially as described.

2. The combination of the shaft A, cams C C, nuts D D, pieces $e\ e'$, bed-piece F, plates J J', and shoe $h$, substantially as described.

FREDERIC E. WELLS.
FRANK O. WELLS.

Witnesses:
EDWIN STRATTON,
RUFUS A. LILLY.